Figure 1:
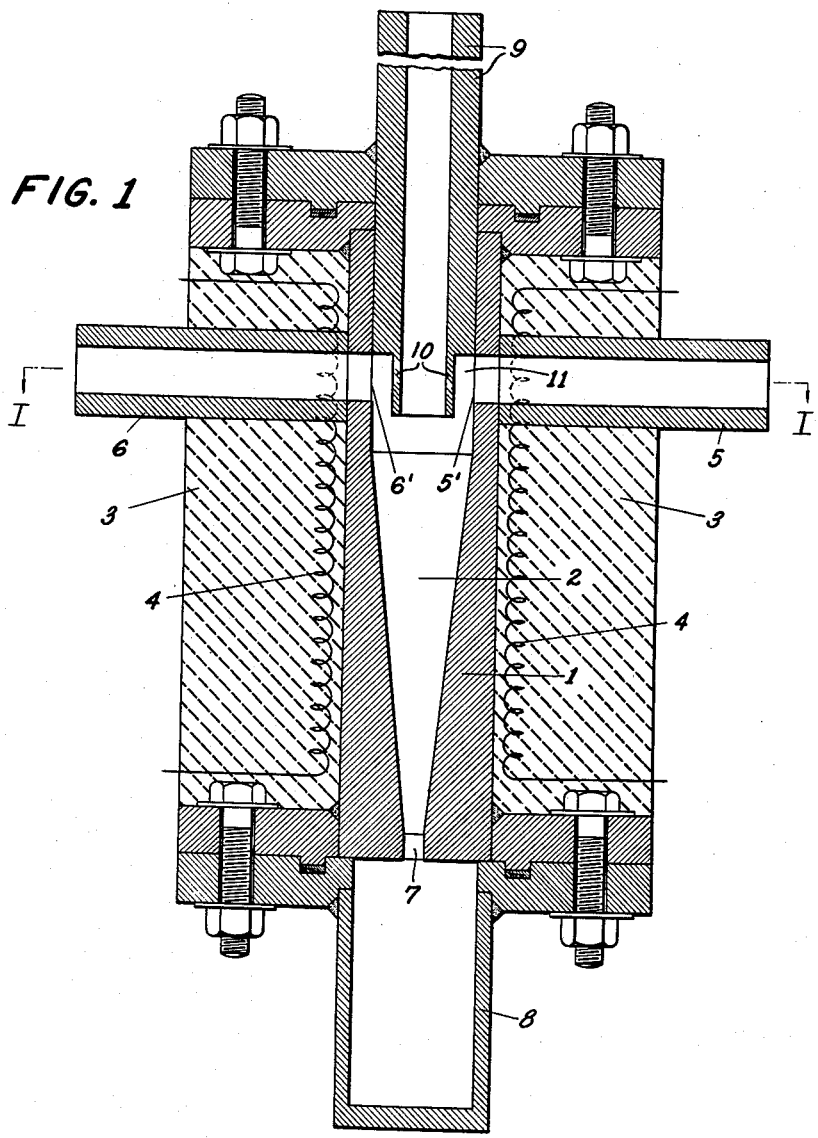

April 20, 1965   ROKUO UKAJI ETAL   3,179,491
METHOD FOR PREPARING URANIUM DIOXIDE
Filed Feb. 20, 1962   3 Sheets-Sheet 2

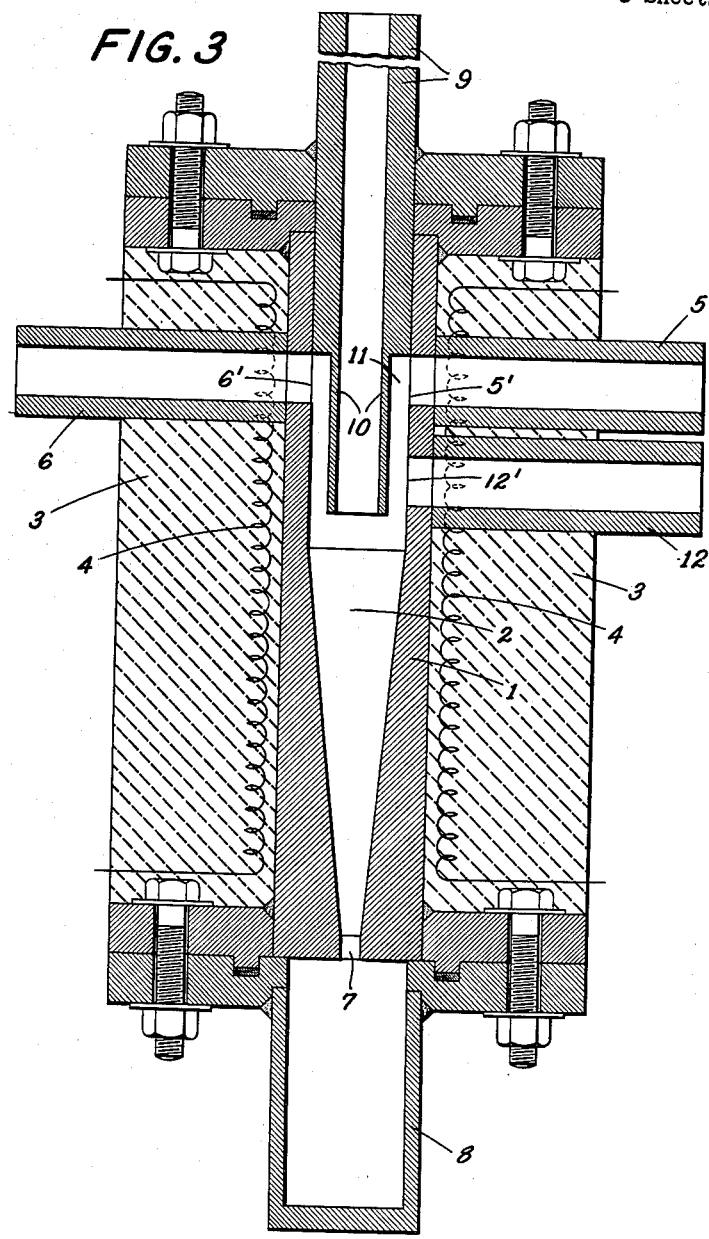

United States Patent Office 3,179,491
Patented Apr. 20, 1965

3,179,491
METHOD FOR PREPARING URANIUM DIOXIDE
Rokuo Ukaji, Ibaraki, and Hiroyuki Wada, Osaka Prefecture, Japan, assignors to Osaka Kinzoku Kogyo Company, Limited, Osaka, Japan
Filed Feb. 20, 1962, Ser. No. 174,515
2 Claims. (Cl. 23—14.5)

This invention relates to the preparation of uranium dioxide, and more particularly to a method for preparing substantially pure uranium dioxide from uranium hexafluoride by gaseous reaction. The final product is obtained in the state of homogeneous particles or powder having excelled reactivity and bulk density, and the fluoride content is reduced to less than 0.01 percent by weight. The invention pertains also to the apparatus with which said method can be executed effectively.

According to the invention, there is provided a method of preparing in a vertical type reactor substantially pure uranium dioxide for use as a nuclear fuel from uranium hexafluoride, which method comprises providing at least 2 substantially confronting gas inlet pipes in a position tangentially associated with and opening into the upper portion of the reactor passage in such a manner that the gaseous substances simultaneously introduced therethrough into the reactor form a spiral movement in the reactor passage to facilitate the contact reaction, simultaneously introducing into the reactor passage uranium hexafluoride through one of the gas inlet pipes and a mixture of excess steam and a reducing agent through the other gas inlet pipe, and collecting the precipitating uranium dioxide particles at the bottom end of the reactor passage. The reducing agent employed is selected from the group of hydrogen, ammonia, carbon monoxide and mixtures of said gases. The temperature used ranges from 350° to 550° C. The used and unreacted gases are removed out of the system through the upper end of the reactor passage.

To prepare in the prior art uranium dioxide for use as a nuclear fuel, uranium hexafluoride is hydrolyzed, the resulting aqueous uranyl fluoride is treated with gaseous or aqueous ammonia, the precipitating ammonium diuranate is separated by filtration, washed with water, dried and thermally decomposed, and the resulting oxides of uranium, namely $UO_3$, $U_3O_8$ and the like, are reduced to the desired uranium dioxide in a current consisting of a reducing agent. This process, however, is so complicated that the reaction conditions can hardly be maintained on a constant level, and the resultant product is accordingly of uneven quality and the fluoride content reaches a considerable amount.

The principle of this invention, on the other hand, is to react uranium hexafluoride directly with a mixture of excess steam and a reducing agent at a temperature ranging from 350° to 550° C. To remove the air out of the system, nitrogen or other inactive gases may be employed. Ammonia is decomposed into hydrogen and nitrogen to participate in the reduction when subjected to the reaction temperature as stated above.

According to the available data, uranium hexafluoride ($UF_6$) is hydrolyzed with steam into uranyl fluoride ($UO_2F_2$) particles or powder having high reactivity, and the resultant uranyl fluoride is reduced by the action of hydrogen to uranium dioxide ($UO_2$) in the following manners:

$$UF_6 + 2H_2O \rightarrow UO_2F_2 + 4HF\uparrow \quad (1)$$
$$UO_2F_2 + H_2 \rightarrow UO_2 + 2HF\uparrow \quad (2)$$

This reaction, however, is accompanied with the following various side reactions:

$$3UO_2F_2 \rightarrow \tfrac{2}{3}U_3O_8 + UF_6\uparrow + \tfrac{1}{3}O_2\uparrow \quad (3)$$
$$4UO_2F_2 \rightarrow U_3O_8 + UF_4 + 2F_2\uparrow \quad (4)$$
$$2UO_2F_2 \rightarrow UO_2 + UF_4 + O_2\uparrow \quad (5)$$
$$UO_2F_2 + H_2O \rightarrow \tfrac{1}{3}U_3O_8 + 2HF\uparrow + \tfrac{1}{6}O_2 \quad (6)$$
$$UF_6 + H_2 \rightarrow UF^4 + 2HF\uparrow \quad (7)$$

It has accordingly been deemed impracticable to prepare uranium dioxide for use as a nuclear fuel from uranium hexafluoride in a current consisting of steam and hydrogen.

In accordance with the present invention, however, it has now been discovered that the side reactions (3), (4), (5) and (6) do not take place when subjected to a temperature ranging from 350° to 550° C.; that the side reaction (7) also does not take place when 2 or more parts by weight of steam are employed to one part by weight of hydrogen; and that uranium tetrafluoride ($UF_4$), even if produced, can be easily hydrolyzed by the action of steam at said temperature in the following manner, since said $UF_4$ is of solid particles and of high reactivity unlike those of Formulas (4) and (5):

$$UF_4 + 2H_2O \rightarrow UO_2 + 4HF\uparrow \quad (8)$$

It is further confirm that a portion of uranyl fluoride ($UO_2F_2$) is converted to uranium trioxide ($UO_3$) in the following manner by the action of steam or oxygen which is present in or conveyed into the reaction system with the gases being employed:

$$UO_2F_2 + H_2O \rightarrow UO_3 + 2HF\uparrow \quad (9)$$
$$UO_2F_2 + O_2 \rightarrow UO_3 + OF_2\uparrow \quad (10)$$

and that said $UO_3$ can be easily reduced to uranium dioxide by the action of the reducing agent due to the high reactivity of said $UO_3$. The steam employed has an important role in the reaction of this invention, but the reaction fails to produce suitable results when 15 or more parts by weight of steam are employed to one part by weight of the reducing agent.

Thus, all the probable side reactions have been almost completely eliminated from the present invention. Such favorable results, however, cannot be obtained with the horizontal type reactor usually employed in the art, where uranium hexafluoride is passed into the reactor along with the mixture of steam and hydrogen. For the resulting solid uranyl fluoride and uranium dioxide tend to precipitate on the inner wall of the reactor and the collecting member, and the decomposition of said uranyl fluoride remains imperfect, since the contact with the steam and the reducing agent is insufficient for satisfactorily accomplishing the required decomposition. This is also the case with the vertical type reactor, where the starting material is introduced into the reactor through the upper end passage of the reactor and a mixture of steam and hydrogen through the bottom end passage of the reactor, and the resulting solid product is collected through the bottom of said reactor. In either case, the fluoride content in terms of $UO_2F_2$ cannot be reduced to no less than 0.1 to 0.7 percent by weight.

In this invention, on the contrary, is employed a vertical type reactor which is provided with at least 2 confronting gas inlet pipes in a position tangentially associated with and opening into the upper portion of the reactor passage, so that the decomposition is performed quite satisfactorily and that the fluoride content present in the final product $UO_2$ is reduced to no more than 0.01 percent by weight in terms of $UO_2F_2$.

In the invention, furthermore, the existence of air in the reaction system does not necessarily prevent the reaction, but the replacement of the air in the reactor with an inactive gas much facilitates the progress of the reaction. The reaction is performed, as stated before, at a temperature ranging from 350° to 550° C., since the aforesaid side reactions (3), (4), (5) and (6) take place when the reaction is performed at a temperature higher than said range, and the satisfactory reaction does not take place when the reaction is performed at a temperature lower than said range.

Figure 2:
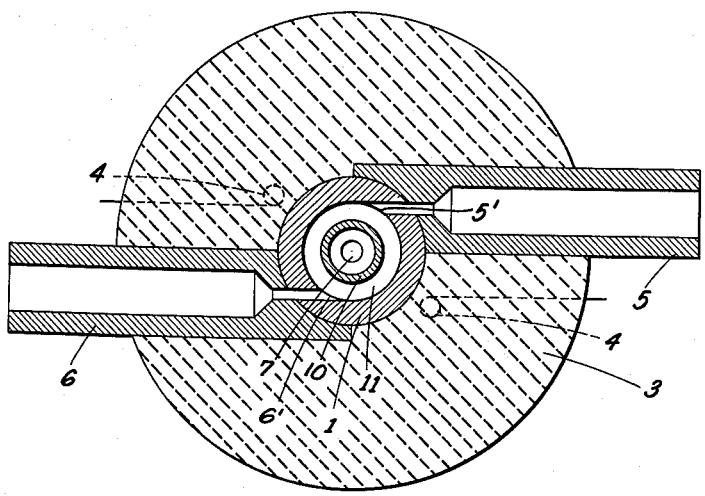

Referring now to the accompanying drawings forming a part of the invention in which like reference characters designate like parts in all the views:

FIGURE 1 is a vertical sectional view of a preferred embodiment of the reactor of this invention; FIGURE 2 is a cross-sectional view of the reactor embodied in FIGURE 1 along the line I—I; and FIGURE 3 is a vertical sectional view of another type of the preferred embodiment of this invention.

Referring more particularly to FIGURES 1 and 2, a monel metal reactor tube 1, which is 75 mm. long and provided with a passage 2, 20 mm. wide in diameter at the upper portion, is housed vertically in a heating pile 3 which is provided with heating members 4, made of nickel-chromium wirings. To the upper portion of said reactor tube 1 are connected gas inlet pipes 5 and 6, both 10 mm. wide in inner diameter, with the openings 5' and 6' tangentially confronting each other and opening into the passage 2. One of said gas inlet pipes 5 and 6, i.e., pipe 5 in the instant embodiment, is associated with the external steam and reducing agent supply source, not shown, via flowmeter, also not shown, and the other pipe 6 is associated with the external uranium hexafluoride supply source, not shown, via flowmeter, also not shown. The reactor passage 2 is tapered from the portion slightly below the gas inlet pipe openings 5' and 6' terminates in an aperture 7, 5 mm. wide in diameter, and opening into the collecting member 8 which is connected with the bottom end of the reactor tube 1. An exhaust pipe 9 which is 9 mm. in inner diameter is vertically housed in the heating pile 3 and connected to the upper end of the reactor tube 1 for removing the used and unreacted gases out of the reaction system by means of a vacuum pump, not shown, via gas absorber filled with sodium fluoride particles, also not shown. The bottom wall 10 of said exhaust pipe 9 is so reduced in thickness that a circular space 11 is formed around the wall 10 in association with the gas inlet pipe openings 5' and 6'.

In use, the air present in the reactor is removed out of the system via exhaust pipe 9 with an inactive gas like argon which is introduced into the reactor through the gas inlet pipes 5 and 6. At the same time, the reactor is heated to a desired reaction temperature ranging from 350° to 550° C. The gas mixture consisting of excess steam and a reducing agent and preheated to said temperature is introduced into the reactor through the gas inlet pipe 5. Simultaneously, the starting material $UF_6$, also preheated to said temperature, is introduced into the reactor through the gas inlet pipe 6. The exit gases are gradually removed out of the system by means of an external vacuum pump via exhaust pipe 9. Following the completion of introduction of the starting material, the supply of the gas mixture of steam and reducing agent is still continued for a short period of time. Thereafter, the heat supply is suspended and the reaction gas mixture is allowed to cool at room temperature.

What is to be noticed in this connection is that the starting material $UF_6$ and the gas mixture of excess steam and a reducing agent are introduced into the reactor through the gas inlet pipes 5 and 6 which are associated with the upper portion of the reactor passage 2 in such a manner that the reactants introduced form a spiral movement in the circular space 11 around the wall 10, whereby the reactants can be mixed satisfactorily to perform the contact reaction to the fullest extent and the fluoride content present in the final product $UO_2$ is reduced to less than 0.01 weight percent in terms of $UO_2F_2$.

Another preferred embodiment is shown in FIGURE 3, wherein a further gas inlet pipe 12, 10 mm. in inner diameter, is provided slightly below the inlet pipe 5. In accordance with this modification, the extended wall 10 of exhaust pipe 9 and the equidistant upper portion of the reactor passage 2 are elongated in such a manner that a circular space 11 is formed around the extended wall 10 of the exhaust pipe 9 in association with the gas inlet pipe openings 5', 6' and 12'. Together with the gas inlet pipe 5, the newly installed inlet pipe 12 is employed for introducing the reducing gas mixture which may be of the same or of the different type of composition as that of the gas mixture introduced through the gas inlet pipe 5. According to this device, the fluoride content present in the final product is reduced more surely.

The steam employed in this invention is effective not only for hydrolyzing $UF_6$ but for converting the by-product fluorides, such as $UF_4$, $UO_2F_2$ and the like, into the desired $UO_2$. The existence of steam in ample amount in the reactor is accordingly indispensable throughout the entire course of the reaction.

Thus, the present invention has made it practicable for the first time in the art to convert $UF_6$ in a very easy and simple manner into substantially pure and homogeneous $UO_2$ having high reactivity and bulk density and containing very slight fluoride content, a product which is very suitable for use as a nuclear fuel.

The metric measurements adopted in FIGURES 1 to 3 are so employed as to meet the requirements of the following examples. It is therefore evident that said measurements shall be modified in accordance with the volume of the materials to be treated.

Preferred examples are as follows:

*Example 1*

The reactor shown in FIGURE 1 was removed of the air by means of argon and heated to 500° C. A gas mixture containing 3 parts by volume of $H_2$ to 1 part by volume of $H_2O$ and preheated to 500° C. was passed into the reactor through the gas inlet pipe 5 at the rate of 16 l./min. At the same time, 350 g. of $UF_6$, also preheated to 500° C., were passed into the reactor through the gas inlet pipe 6 for 2 hrs. The exit gases were gradually removed out of the system by means of the external vacuum pump. After the termination of introduction of $UF_6$, the reducing gas mixture was further supplied for additional 30 min. The heat supply was then suspended and the reaction gas mixture was allowed to cool at room temperature. $UO_2$ collected in the collecting member 8 amounted to 246 g. Yield was 91% by weight. X-ray diffraction showed $CaF_2$ type lattice peculiar to $UO_2$. No impure substances were detected. Chemical analysis showed 0.008% by weight of hypothetical $UO_2F_2$ and a trace of heavy metals also hypothetically derived from the starting material.

*Example 2*

The reactor shown in FIGURE 3 was removed of the air by means of argon and heated to 500° C. A gas mixture containing 1 part by volume of $H_2$ and 1 part by volume of $H_2O$ and preheated to 500° C. was introduced into the reactor through the gas inlet pipe 5 at the rate of 12 l./min. Another gas mixture containing 4 parts by volume of $H_2$ to 1 part by volume of $H_2O$ and preheated to 500° C. was simultaneously introduced into the reactor through the gas inlet pipe 12 at the rate of 5 l./min. At the same time, 355 g. of $UF_6$, also preheated to 500° C., was passed into the reactor through the gas inlet pipe 6 for 2 hrs. The exit gases were removed out of the system by means of the external vacuum pump. After the termination of introduction of $UF_6$, the reducing gas mixtures were further supplied for additional 30 min. The heat supply was then suspended, and the reaction gas mixture was allowed to cool at room temperature. $UO_2$ collected in the collecting member 8 amounted to 242 g. Yield was 89% by weight. Fluoride content was 0.005% by weight in terms of $UO_2F_2$.

The reactivity of the product of this invention is tested in the following manners:

Ammonium diuranate prepared from $UF_6$ was treated according to the ordinary method in the art and finally reduced to $UO_2$ with hydrogen at 600° C. 20 g. of the resulting $UO_2$ were fluorinated at 350° C. in HF current supplied at the rate of 150 g./hr. for 1 hr. The yield of the resulting $UF_4$ was 62% by weight.

In contrast thereto, the yield of $UF_4$ derived under the same conditions as above from $UO_2$ of Example 1 reached 95% by weight, and that of Example 2 was 93% by weight. It is thus evident that the $UO_2$ obtained in accordance with the principle of this invention has an excelled reactivity.

As will be apparent to those skilled in the art, various modifications and changes may be made in the method and apparatus described hereinbefore. It is accordingly our intention that the invention be construed rather broadly within the spirit and scope as set forth in the accompanying claims.

What we claim is:

1. A method of preparing uranium dioxide containing less than 0.01% by weight fluoride calculated as $UO_2F_2$ which comprises intimately and homogeneously mixing at a temperature of 350° to 550° C. in a rapid spiral movement uranium hexafluoride vapor and a mixture of excess steam and at least one reducing gas selected from the group consisting of hydrogen, ammonia and carbon monoxide; removing product gases and collecting the precipitated uranium dioxide.

2. A method of preparing uranium dioxide containing less than 0.01% by weight fluoride calculated as $UO_2F_2$ which comprises introducing uranium hexafluoride and simultaneously a mixture of an excess of steam and hydrogen into the upper portion of an elongated vertical reaction space of circular cross-section, said uranium hexafluoride and said mixture being introduced at about 500° C. tangentially into said space and substantially opposed to each other; removing product gases from the top of said reaction space and collecting the resulting uranium dioxide at the bottom of said space.

References Cited by the Examiner

UNITED STATES PATENTS

| | | | |
|---|---|---|---|
| 729,008 | 5/03 | Sutton et al. | |
| 2,490,519 | 12/49 | Haunz | 23—252 |
| 2,672,404 | 3/54 | Schultz | 23—252 |
| 2,906,598 | 9/59 | Googin | 23—14.5 |
| 3,037,839 | 6/62 | Googin | 23—14.5 |

OTHER REFERENCES

Katz et al.: "Chemistry of Uranium," First Edition, pp. 304–307, 570–572 (1951).

ANL 6023, pp. 3–7, 10–14, August 1959.

ANL 6145, pp. 124–128, Chem. Engng. Div. Summary Report, January-March 1960.

ANL 6183, pp. 118–122, Chem. Engng. Div. Summary Report, April-June 1960.

REUBEN EPSTEIN, *Acting Primary Examiner*.

CARL D. QUARFORTH, OSCAR R. VERTIZ,
*Examiners.*